United States Patent [19]

Brock

[11] Patent Number: 4,803,686
[45] Date of Patent: Feb. 7, 1989

[54] SPATIAL FILTER WITH GAIN

[75] Inventor: John C. Brock, Redondo Beach, Calif.

[73] Assignee: TRW Inc., Redondo Beach, Calif.

[21] Appl. No.: 80,855

[22] Filed: Aug. 3, 1987

[51] Int. Cl.$^4$ ............................................. H01S 3/19
[52] U.S. Cl. .................................. 372/44; 307/425; 330/4.3; 372/21
[58] Field of Search ................. 372/21, 44, 98, 109; 307/425, 428; 330/4.3

[56] References Cited

U.S. PATENT DOCUMENTS 4,528,464 7/1985 Chemla et al. .................. 307/425

OTHER PUBLICATIONS

R. K. Jain, "Degenerate Four-Wave Mixing Near the Band Gap of Semi-Conductors", Appl. Phys. Lett 35(6), Sep. 15, 1979, pp. 454-456.

Primary Examiner—James W. Davie
Attorney, Agent, or Firm—Noel F. Heal; Sol L. Goldstein

[57] ABSTRACT

Apparatus and a related method for generating a uniphase reference beam from a weak and aberrated input probe beam in an optical system. A portion of the input probe beam is split off and injected into the cavity of a laser, such as a semiconductor diode laser, where four-wave mixing takes place and an amplified input wave or its phase conjugate is output. Because the laser cavity is selected to provide single-mode operation, the laser provides not only amplification but an output that includes a uniphase wave, which may be interfered with the original aberrated input probe beam for purposes of obtaining wavefront information.

7 Claims, 1 Drawing Sheet

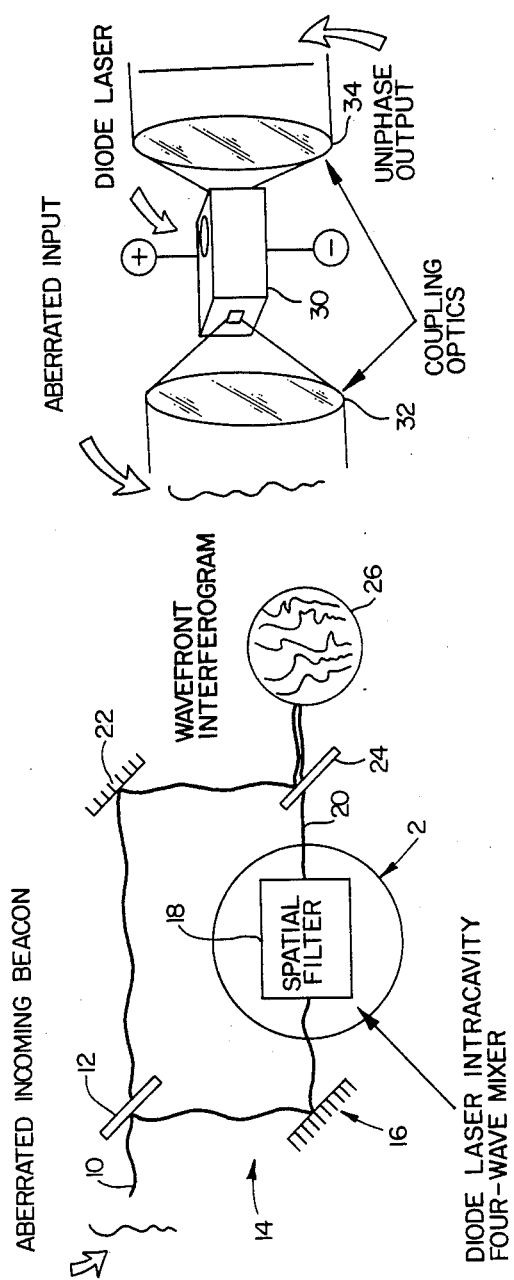

SPATIAL FILTER WITH GAIN

BACKGROUND OF THE INVENTION

This invention relates generally to the field of adaptive optics and, more particularly, to techniques for sensing aberrations in optical wavefronts. The term adaptive optics refers to optical systems in which one or more elements are modified to adapt to changing conditions, such as continuously changing atmospheric conditions that cause aberrations in optical wavefronts. In an adaptive optical system, aberrations are sensed in a wavefront sensor, and error signals are generated for the control of a corrective device, such as a deformable mirror, which compensates for the detected wavefront aberrations and thereby continuously adapts the optical system to the changing conditions. In a number of applications of adaptive optics, it is necessary to sense the aberrations in a very weak optical beam. These applications include transatmospheric imaging in astronomy, optical communications links, high-power optical beam propagation, and holography.

In these and other applications, the wavefront of an incoming optical beam is sensed in order that in incoming or outgoing beam can be corrected for optical aberrations. An important class of wavefront sensors utilize point diffraction interferometry to obtain phase front information from the incoming wave. In this approach, a portion of the incoming beam is split off and passed through a spatial filter to obtain a clean, uniphase reference beam that can be interfered with the remaining portion of the aberrated incoming beam, to obtain the desired phase front information. This technique makes use of the principle that a pinhole spatial filter produces a practically perfect spherical wavefront. The difficulty with the approach is that, for many applications, there is insufficient optical power in the reference beam after splitting off from the incoming beam and passing through the pinhole spatial filter.

It has been proposed to use conventional laser amplifiers to amplify a portion of an input or probe beam. It has also been suggested that some kind of amplification be employed to operate on a spatially small portion of an input beam, by first spatially filtering, then amplifying the beam. However, neither of these solutions has provided a satisfactory solution to the problem.

It will be appreciated from the foregoing that what is needed is a technique for generating a relatively strong, coherent, uniphase reference wave for interfering with an aberrated beam. The present invention satisfies this need, as will become apparent from the following summary of the inventive principles.

SUMMARY OF THE INVENTION

The present invention resides in the use of a spatial filter that not only provides the required coherent uniphase reference beam, but also provides amplification of the reference beam, so that a relatively weak incoming aberrated beam can still produce a strong reference beam for interfering with the aberrated beam and detecting the wavefront aberrations. More specifically, the invention utilizes nonlinear parametric amplification of the reference beam. In the illustrative embodiment of the invention, the input beam is amplified by a process of four-wave mixing, which takes place inside the cavity of a diode laser. Because the diode laser has a small entrance aperture and is single-moded in nature, the input beam is not only amplified but is also spatially filtered to provide the desired uniphase output. The amplified and spatially filtered input beam is present in the output from the diode. Also present is the amplified and spatially filtered conjugate of the input beam, and the normal laser output of the diode.

Briefly, and in general terms, the apparatus of the invention includes means for splitting off a portion of the input probe beam, a laser cavity containing a nonlinear gain medium and providing a single transverse mode of oscillation, means for injecting the portion of the input probe beam into the laser cavity to provide four-wave mixing within the cavity, and means for deriving a uniphase output beam from the laser cavity. The laser cavity provides a spatial filtering function by its small entrance aperture and its single-mode of operation.

In terms of a novel method, the invention includes the steps of taking a portion of the input probe beam, inputting the portion of the input probe beam into a laser cavity having a single transverse mode of oscillation, and generating in the laser cavity, by a four-wave mixing process, a uniphase output beam.

In the illustrative embodiment of the invention, the step of generating a uniphase output beam includes generating counter-propagating pump waves within the laser cavity, and four-wave mixing the pump waves and the portion of the input probe beam to generate output waves that include the desired output beam. The method also includes the step of filtering the output from the cavity to select the desired output beam.

It will be appreciated from the foregoing that the present invention provides a significant advance in the field of adaptive optics. In particular, the invention provides a novel approach for generating a coherent uniphase reference beam from a relatively weak aberrated input beam. Among the advantages of this approach are the extremely high optical gain applied to the input signal, automatic spatial filtering to remove spatial phase aberrations from the generated reference beam, and relatively low noise performance, allowing reduction in the required input signal strength. The amplification or gain is provided conveniently and efficiently using electric current pumping in a diode laser, which has the added advantages of compactness and reliability. Other aspects and advantages of the invention will become apparent from the following more detailed description, taken together with the accompanying drawings.

BRIEF DESCRIPTION OF THE DRAWINGS

FIG. 1 is a schematic diagram showing how an incoming aberrated beam is used to generate a reference beam using a spatial filter;

FIG. 2 is a fragmentary schematic diagram showing the spatial filtering arrangement of the present invention.

DESCRIPTION OF THE PREFERRED EMBODIMENT

As shown in the drawings for purposes of illustration, the present invention is principally concerned with techniques for wavefront sensing in adaptive optics. In many applications of adaptive optics, it is necessary to sense wavefront aberrations in a relatively weak incoming optical beam. A commonly used technique is shown in FIG. 1. The incoming beam, indicated by reference numeral 10, has a portion of its energy split off in a beam splitter 12, to form a separate reference arm 14. The reference arm 14 consists of conventional optical elements, such as a plane mirror 16, and also includes a spatial filter 18, usually in the form of pinhole filter. The beam 20 emerging from the spatial filter 18 is of practically uniform phase, because of the nature of a pinhole filter. The remaining portion of the incoming beam 10 is passed through other optical elements, such as a plane mirror 22, and is combined with the reference beam 20 in another beam splitter 24, here used to combine the two beams again and form a wavefront interferogram, indicated at 26. Although this arrangement functions satisfactorily when the incoming beam 10 is of at least moderate strength, the reference beam produced from a weak incoming beam is not usually strong enough to provide accurate wavefront information from the interferogram.

In accordance with the present invention, the spatial filter 18 also provides optical gain to the reference beam, and thereby permits the use of point diffraction interferometry with relatively weak incoming optical beams. In the presently preferred embodiment of the invention, the spatial filter 18 includes a single-mode semiconductor diode laser 30, and coupling optics, indicated by the lenses 32 and 34. The incoming reference beam 20 is focused by lens 32 into one facet of the laser diode 30. The laser provides a cavity in which four-wave mixing can take place.

Four-wave mixing is a common technique used in adaptive optics systems for generating the phase conjugate of an optical wave. Four-wave mixing and parametric amplification are discussed in the technical literature. For example, intracavity four-wave mixing in diode lasers is discussed in a paper by Nakajima and Frey, entitled "Intracavity nearly degenerate four-wave mixing in a (GaAl)As semiconductor laser," Appl. Phys. Lett 47 (8), Oct. 15, 1985. Four-wave mixing in this paper is discussed in the context of a technique for producing phase conjugate waves. However, the paper describes a (GaAl)As semiconductor laser diode structure in which four-wave mixing takes place in the manner required for the practice of the present invention.

The term four-wave mixing arises because there are four distinct waves propagating in a cavity in which four-wave mixing takes place. In the present context, these include two counter-propagating pump waves due to the lasing action within the cavity, an input wave, and a conjugate output wave. The efficiency of the four-wave mixing process depends on the square of the pump wave intensity and the strength of the third-order nonlinearity of the optical material in the cavity. In most four-wave mixing processes, the third-order optical nonlinearity of the medium is very small and the four-wave mixing efficiency is low. In four-wave mixing in the cavity of a laser diode, additional gain of the output waves can be achieved because of the high degree of saturable gain provided by the gain medium.

The output from the diode laser 30 includes an amplified form of the input reference beam, an amplified conjugate of the input reference beam, and the normal output of the diode laser. Because of the strong pump fields, the nature of the optical nonlinearity, and a wide gain bandwidth associated with diode lasers, four-wave mixing can be accomplished either degenerately or non-degenerately. In the degenerate case, the input beam frequency matches that of the counter-propagating pump fields. Thus all four waves, including the conjugate of the input, are at the same frequency, and separation of the outputs is difficult. In non-degenerate operation, the input beam frequency is offset from the frequency of the laser. Because the energy of the two pump waves must be balanced by the combined energies of the input signal and conjugate waves, the conjugate wave will have a frequency offset from the laser frequency by the same amount as the input wave, but in the opposite direction. Consequently, frequency filtering can be conveniently employed to separate the waves that are output from the laser.

In addition to providing four-wave mixing and parametric amplification of the input or probe beam, the diode laser 30 fulfills the useful function of spatial filtering. Spatial filtering is achieved because the input facet of the laser has a very small entrance aperture, and the laser is selected to operate in only a single transverse mode. Either the amplified input probe beam, or the amplified conjugate, can be used for purposes of interference with the aberrated beam, to generate wavefront information. An optical filter, such as a Fabry-Perot interferometer, can be employed to separate the desired amplified output from the laser. Alternatively, all of the output beams from the laser can be mixed with the aberrated beam on a photodetector array and the phase difference determined by heterodyne detection.

The advantages of using a diode laser for spatial filtering and amplification of a weak input beam are that the laser provides an extremely high optical gain, while automatically spatially filtering the input beam. In addition, use of parametric wave mixing provides low noise performance, which permits reduction of the necessary input signal strength. Finally, the optical amplification is achieved conveniently with electric current pumping, in a compact and readily available device.

It will be appreciated from the foregoing that the present invention represents a significant advance in the field of adaptive optics and interferometry generally. In particular, the invention provides a novel technique for generating a reference beam from a relatively weak input beam, for use in detecting wavefront aberrations in the input beam. It will also be appreciated that, although an embodiment of the invention has been described in detail for purposes of illustration, various modifications may be made without departing from the spirit and scope of the invention. Accordingly, the invention is not to be limited except by the appended claims.

I claim:

1. A method for generating an amplified uniphase reference beam from a weak input probe beam having wavefront aberrations, the method comprising the steps of:
   taking a portion of the input probe beam;
   inputting the portion of the input probe beam into a laser cavity having a single transverse mode of oscillation; and
   generating in the laser cavity, by a four-wave mixing process, a uniphase output beam.

2. A method as defined in claim 1, wherein the step of generating a uniphase output beam includes:
   generating counter-propagating pump waves within the laser cavity; and
   four-wave mixing the pump waves and the input portion of the input probe beam to generate output waves that include the desired output beam.

3. A method as defined in claim 2, and further including the step of:

filtering output waves from the cavity to select the desired output beam.

4. A method as defined in claim 1, wherein:
the laser cavity is that of a semiconductor diode laser having a single transverse mode of oscillation.

5. Apparatus for providing an amplified uniphase reference beam from a weak and wavefront-aberrated input probe beam, the apparatus comprising:
means for splitting off a portion of the input probe beam;
a laser cavity containing a non-linear gain medium and providing a single transverse mode of oscillation;
means for injecting the portion of the input probe beam into the laser cavity to provide four-wave mixing within the cavity; and
means for deriving a uniphase output beam from the laser cavity.

6. Apparatus as defined in claim 5, wherein:
the laser cavity is of a single-mode semiconductor diode laser.

7. Apparatus as defined in claim 6, wherein:
the means for injecting the input beam and deriving the output beam include lenses for focusing the input beam into an entrance aperture of the laser, and for collimating the output beam.

* * * * *